Nov. 9, 1943.  W. L. GROENE  2,333,859
CRANKSHAFT BLANK
Original Filed Nov. 12, 1940  3 Sheets-Sheet 1
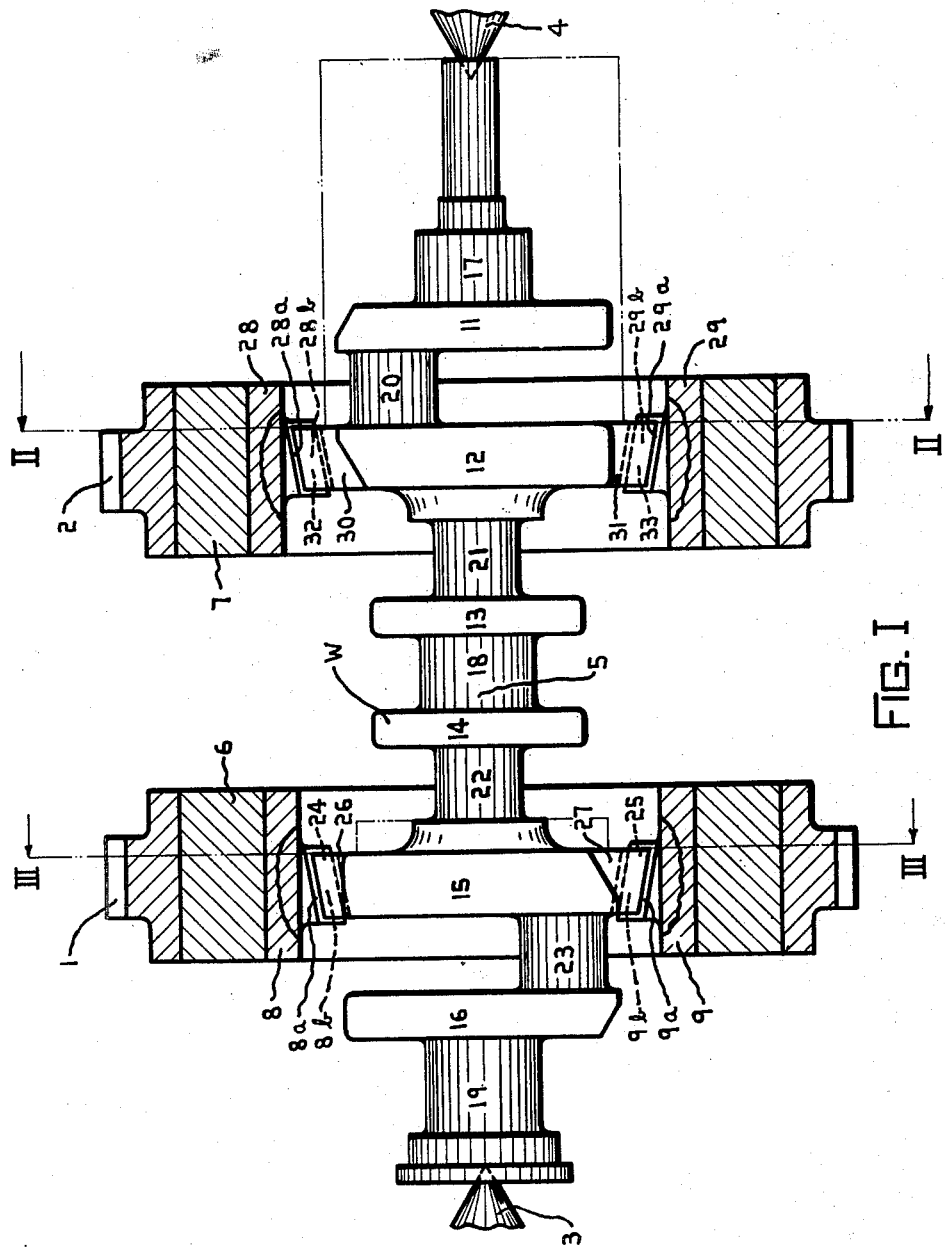
FIG. I
INVENTOR.
Willard L. Groene Nov. 9, 1943.   W. L. GROENE   2,333,859
CRANKSHAFT BLANK
Original Filed Nov. 12, 1940   3 Sheets-Sheet 2
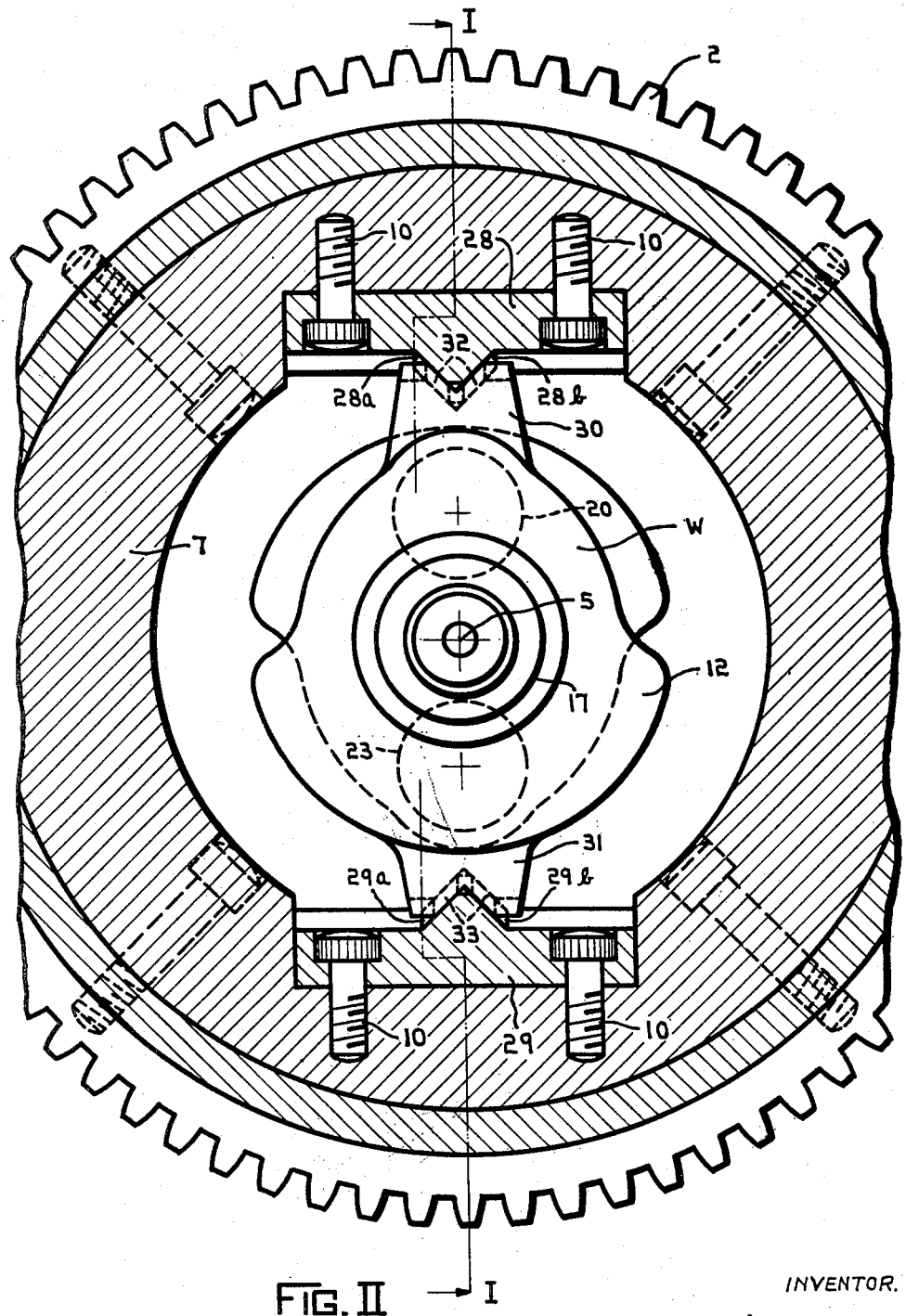
FIG. II
INVENTOR.
Willard L. Groene

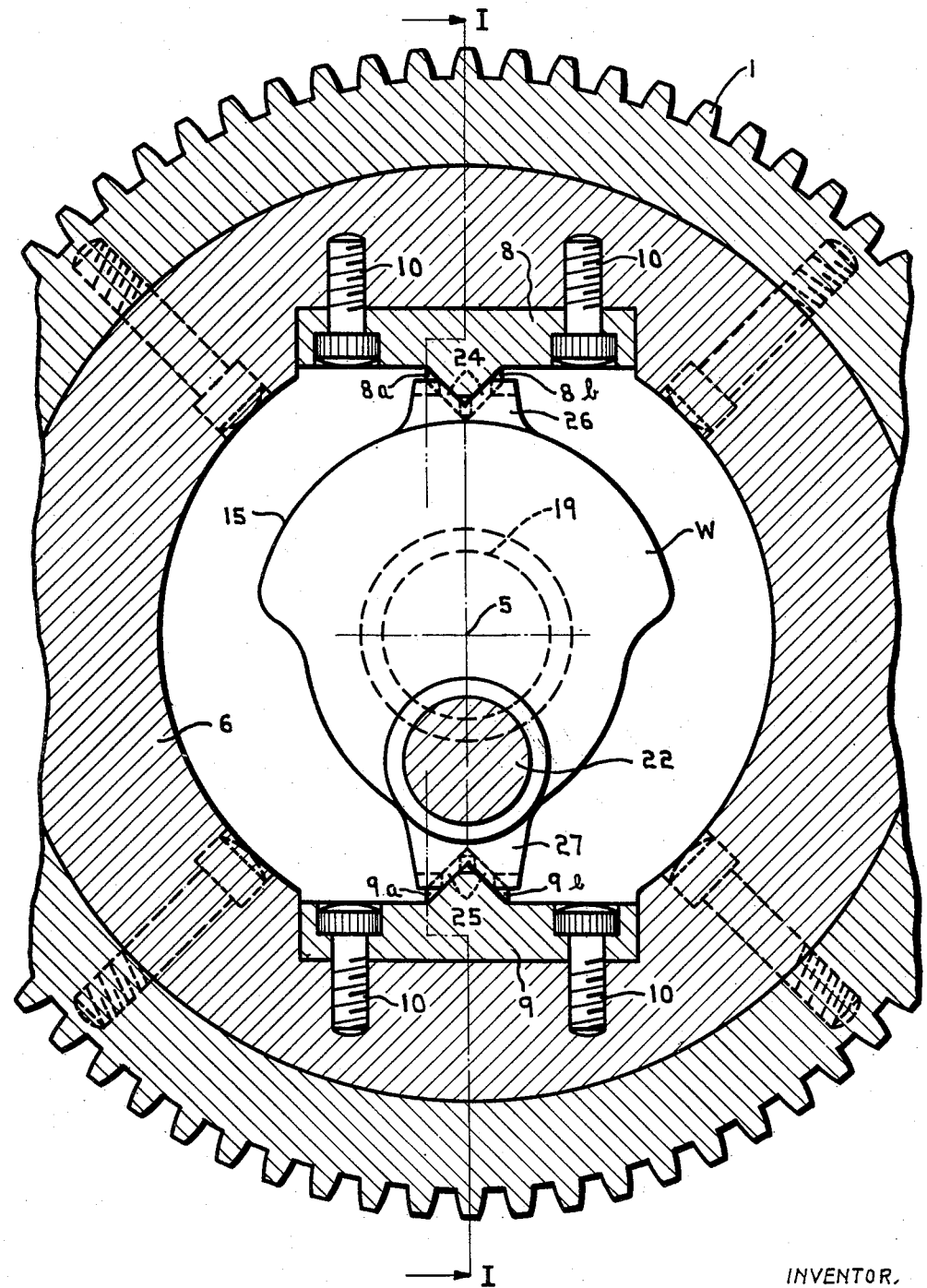
FIG. III

Patented Nov. 9, 1943

2,333,859

UNITED STATES PATENT OFFICE 2,333,859

CRANKSHAFT BLANK

Willard L. Groene, Cincinnati, Ohio, assignor to The R. K. Le Blond Machine Tool Company, Cincinnati, Ohio, a corporation of Delaware Original application November 12, 1940, Serial No. 365,354. Divided and this application June 20, 1942, Serial No. 447,875

1 Claim. (Cl. 29—148)

This application is a divisional application of application Serial No. 365,354, filed November 12, 1940, now Patent No. 2,299,975.

This invention pertains to chucking mechanism for rough irregular work pieces, particularly of the nature of multi-throw internal combustion engine crankshafts. This invention is especially adapted to lathes for turning the various bearing portions of such crankshafts commonly known as center drive or double center drive crankshaft lathes of a type for example as shown in patent of William F. Groene, No. 2,191,935, dated February 27, 1940, in which a crankshaft is chucked intermediate its ends in a pair of center drive ring gear work spindles and supported at its ends in suitable lathe centers.

In chucking crankshafts in such type lathes in the past, it has been common to use machined locating areas on the webs of the crankshaft by which chucking members were engaged in gripping relationship on these machined locating surfaces so as to support and rotate the crankshaft while its ends were supported on lathe centers. However, the mechanism used in the past has been inefficient because of the time required in effecting the clamping operation of the chucking members on the premachined locating surfaces heretofore used on such crankshaft web.

There has also been the trouble of play and vibration being set up between the machined locating surfaces and the chucking members in the center drive ring gear chucking devices resulting in chatter and imperfections on the surfaces being machined on the various bearing portions of the crankshaft.

Also in these former chucking mechanisms, utilizing premachined locating surfaces, difficulties were encountered in accurately and quickly determining the correct axial spacing of the crankshaft, that is, its position longitudinally of the axis of rotation of the lathe, again consuming considerable time in getting the work into the lathe and properly oriented for engagement of the chucking devices thereon preparatory to getting ready to do the actual cutting on the work piece.

It is therefore the object of this invention to modify the relative location and position of the various premachined locating work piece surfaces on the webs of the crankshaft so as to effect more efficient chucking of the work in conjunction with these uniquely arranged premachined locating surfaces with the chucking device. By this arrangement a chucking device of the greatest simplicity having no moving parts whatever that need be adjusted, operated, or otherwise manipulated to effect the clamping of the work in the lathe may be used and which simplified chucking mechanism provides means for automatically firmly holding the work on the work spindle and also automatically provides the correct endwise spacing of the crankshaft in the lathe without any effort or skill on the part of the operator and requiring no time whatever, as this is done, with this unique arrangement, during the time the work is being loaded into the lathe. In other words, in this new construction which I have herein developed, there will be no clamping time whatever as the loading and clamping take place simultaneously.

Furthermore, the loading of this unique crankshaft in the chucking device can be undertaken while the crankshaft is moved axially into or out of the chucking devices while on the axis of rotation of the lathe, utilizing, for example, apparatus of a type shown in patent of William F. Groene et al., No. 2,211,722, dated August 13, 1940, in which the work is slid axially on the premachined locating surfaces into and out of the chucking devices without moving it radially of the chucking devices when therein during the final chucking or positioning of the work in the chucks preparatory to effecting the clamping.

These features are accomplished by providing a crankshaft with premachined V notches, or similar locating surfaces, having angularly related faces which are positioned in angular relationship to the axis of rotation of the crankshaft rather than parallel to said axis as has always been done heretofore in the past in preparing the crankshaft with such locating surfaces.

Another object of this invention is to provide a chucking device having locating surfaces arranged to engage angularly related surfaces on a cranksnaft in such a way that there will be no moving work engaging members whatever in the chuck and such chuck being so arranged that the axial movement is loading the crankshait into the chuck automatically effects the tight clamping and locking of the crankshait in the work spindle utilized to support and rotate the work during the cutting operation.

And a further object is to provide in chucking devices of this type, having all work engaging members fixed on the work spindle, an angularly related arrangement of the work engaging abutment surfaces relative to the axis of rotation of the chuck, so that as the work is loaded axially into the chuck, not only is it properly rigidly supported in said chucks, but it is also accurately and automatically positioned lengthwise of this axis of rotation without further effort or skill upon the part of the operator.

Further features and advantages of this invention will appear from the detailed description of the drawings in which:

Figure I is a diagrammatic section through a pair of center drive ring gear chucking devices and the lathe centers showing the work piece gripped in a typical double center drive lathe illustrating the angularly related work engaging surfaces in the center drive chucks and the mating premachined locating surfaces on the webs of the crankshaft lying in angular relationship to the axis of rotation of the crankshaft in the lathe.

Figure II is a right hand end view of the apparatus in Figure I, partly in section on the line II—II of Figure I, showing the right hand chucking device engaged on the work crankshaft.

Figure III is a view similar to that of Figure II but on the line III—III of Figure I, showing the left hand center drive ring gear chucking device engaged on its particular web of the crankshaft.

For illustrative purposes, this invention is shown applied particularly to a double center drive crankshaft lathe having a pair of center drive ring gears 1 and 2 suitably journaled and driven in the lathe frame in the conventional manner for such lathes. Associated with these center drive ring gears 1 and 2, are the centers 3 and 4 which are properly aligned on the axis of rotation 5 of the center drive ring gears 1 and 2.

In each of the center drive ring gear chucks 1 and 2 are provided the cartridge members 6 and 7 respectively. In the ring gear 1 is the cartridge 6 in which are fixed the locating blocks 8 and 9 by suitable screws 10 so as to rigidly hold them in proper position on the cartridge member 6. Each of these locating blocks 8 and 9 have angularly related accurately positioned work engaging surfaces 8a and 8b, and 9a and 9b, Figure III, which lie in imaginary planes which are angularly related to each other for each of the blocks and which are also each in themselves angularly related to the axis of rotation 5. These surfaces 8a—8b and 9a—9b engage mating surfaces, premachined on a work piece or crankshaft W having the respective webs 11, 12, 13, 14, 15, and 16 which interconnect the line bearing portions 17, 18, and 19 with the pin bearings 20, 21, 22, and 23. The web 15 being prepared with appropriate premachined located surfaces 24 and 25 on the projecting lugs 26 and 27 of the web 15 which nicely fit in firm engagement with the locating surfaces on the blocks 8 and 9 fixed in the chuck body.

Similarly, in the ring gear 2 is fixed the cartridge member 7 in which is carried the locating work engaging blocks 28 and 29, held in place by suitable screws 10, which have the work engaging surfaces 28a and 28b and the work engaging surfaces 29a and 29b arranged in planes angularly related to each other as to the axis of rotation 5 as in the case of the center drive ring gear 1. Likewise, on the lugs 30 and 31 formed on the web 12 of the crankshaft W, are provided appropriate mating surfaces 32 and 33 for these surfaces 28a—28b and 29a—29b, which nicely engage locating surfaces on the blocks 28 and 29.

It is to be noted that the locating surfaces and blocks 28 and 29 are farther radially removed from the axis of rotation 5 of the lathe than are the locating blocks 8 and 9 with their respective locating surfaces, so as to permit access of the crankshaft into both chucks as it is slid axially into position shown in Figure I.

The centers 3 and 4 in this arrangement serve substantially to steady the ends of the crankshaft and in no way axially position the crankshaft along the length of the axis, as this is automatically done by engagement of the tapered faces 24—25 and 32—33 on the crankshaft with the similar tapered faces on the locating blocks in the chucks.

Thus, the operation of this chucking arrangement consists in providing on the crankshaft web, angularly related locating surfaces which are angularly related to each other and angularly related also to the axis of rotation 5 of the crankshaft in the lathe and then to axially insert the crankshaft from the right, Figure I, moving it while on the axis of rotation 5 of the lathe, to the left until the respective mating surfaces engage firmly in both of the chucking devices simultaneously, to thereby, first of all, definitely automatically axially position the crankshaft along the length of the axis 5 and also to firmly lock the crankshaft webs 12 and 15 in the respective ring gears 2 and 1 against any lost motion or looseness which would otherwise cause chatter and without requiring any clamping or manipulation of any chucking members of any kind on the part of the operator. The centers are then lightly run into proper running contact with the ends of the crankshaft to form the necessary steadying of the outer end of the shaft.

Having thus fully set forth and described my invention what I claim as new and desire to secure by United States Letters Patent is:

A blank for forming a multi-throw crankshaft comprising line bearing portions and pin bearing portions interconnected by rough irregular webs having conical center holes premachined in the ends of said blank to define the main axis of rotation of said crankshaft and re-entrant V-notch locating means premachined in the periphery of the webs of said crankshaft, the sides of said notches forming locating surfaces lying in planes angularly related to each other and to said axis of rotation, said planes intersecting in a line lying in a third plane passing through the axis of rotation defined by said centers.

WILLARD L. GROENE.